(No Model.)
G. G. FRELINGHUYSEN.
Horse Rake.
No. 231,787. Patented Aug. 31, 1880.
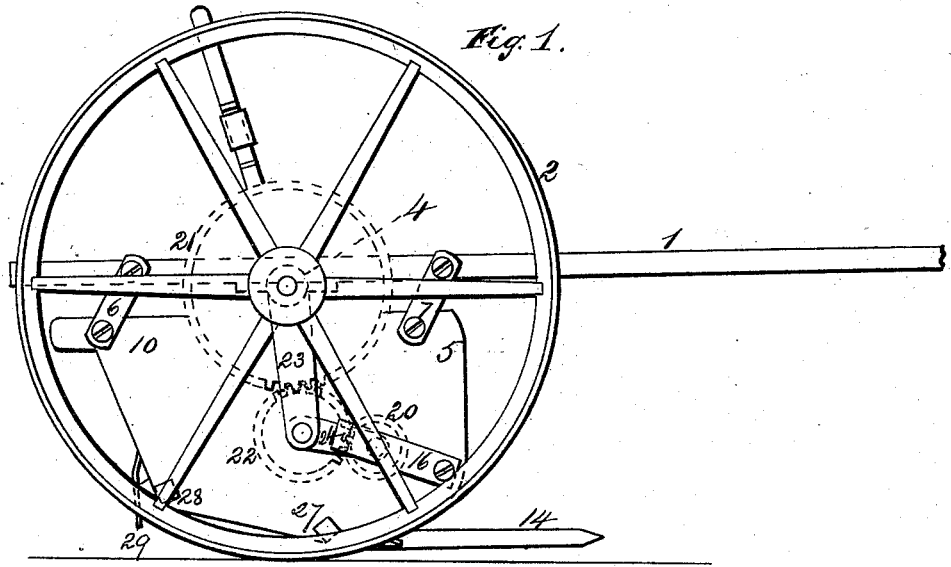
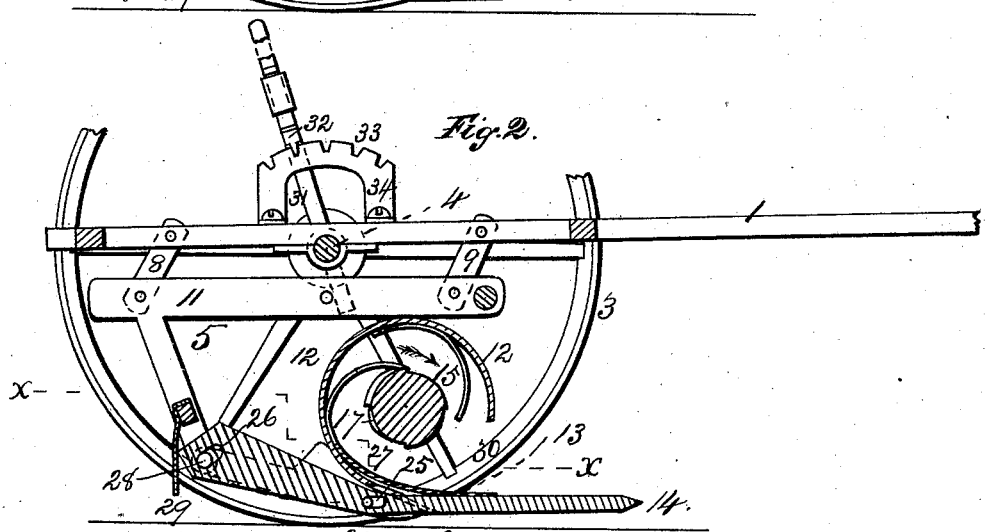
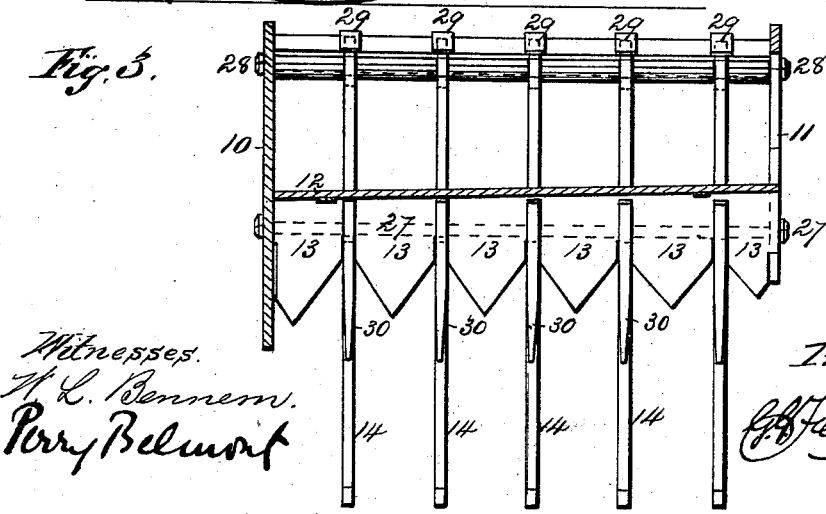
Witnesses.
H. L. Bennem.
Perry Belmont.
Inventor.
G. G. Frelinghuysen (No Model.)                                            2 Sheets—Sheet 2.
G. G. FRELINGHUYSEN.
Horse Rake.
No. 231,787.                    Patented Aug. 31, 1880.
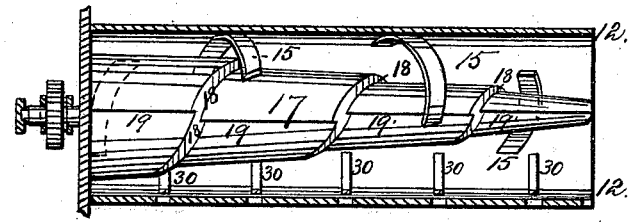
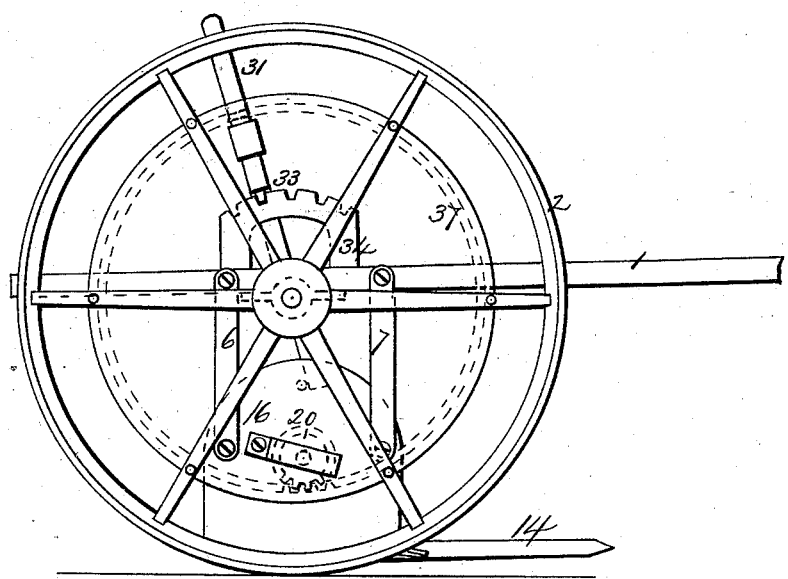
Witnesses.                                      Inventor.

UNITED STATES PATENT OFFICE.

GEORGE G. FRELINGHUYSEN, OF NEWARK, NEW JERSEY.

HORSE-RAKE.

SPECIFICATION forming part of Letters Patent No. 231,787, dated August 31, 1880.

Application filed June 18, 1880. (No model.)

*To all whom it may concern:*

Be it known that I, GEORGE G. FRELING-HUYSEN, of the city of Newark, county of Essex, and State of New Jersey, have invented a new and useful Improvement in Rakes, (Case A,) of which the following is such a full, clear, and exact description as will enable others skilled in the art to which this my invention most nearly appertains to make and use the same, when taken in connection with the accompanying drawings, in which—

Figure 1 is a side view. Fig. 2 is a longitudinal section. Fig. 3 is a horizontal section of the rake-frame, cylinder, and teeth on the line *x x* of Fig. 2. Fig. 4 is a vertical section of the cylinder, with the cone-twister and springs on interior of cylinder in elevation. Fig. 5 is an end or side view of a modification of gearing.

The nature of my invention consists of a rake which delivers continuously in its course across the field the hay gathered by it without the necessity of being dumped, and twists the hay thus delivered into a rope-like form; also, of so constructing a rake that it is raised up from the ground by being pushed or swung back on the main or supporting frame; and, also, in so attaching the teeth that the point of each tooth will be raised independently by being pushed back on striking an obstruction.

The shafts and main frame of the rake are shown at 1, attached to the axle 4 by journal-boxes. The wheels 2 and 3 are rigidly attached to the axle, one at either end. On this main frame 1, supported on the axle 4 and wheels 2 and 3, is suspended the rake-frame 5 (hereinafter more fully described) by the links 6, 7, 8, and 9. One end of each link is attached to the main frame, and the other end of each is attached to the rake-frame, by pivots therein passing through the link in such a manner that the rake-frame 5 is free to swing below the main frame.

The side frames, 10 and 11, are appropriately connected to one another by cross-pieces, and constitute what has been designated as the "rake-frame," which has attached to it the rake-teeth and the cylinder and twisting mechanism hereinafter described.

Between the side frames, 10 and 11, is the cylinder 12, attached at one end to the side frame, 10, which forms a head or end for the cylinder 12, and at the other end to the side frame, 11, which is cut away to correspond with the interior of the cylinder 12, where the cylinder and this side frame join one another. Through this open end of the cylinder the hay gathered by the rake is passed out, and delivered on the ground near the end of the cylinder, being forced out by the spiral cone-twister. The wheel adjacent to the open end of the cylinder is placed at sufficient distance from it, by means of lengthening of the axle 4, to allow the gathered hay to be delivered without interference with the wheel. A segment of this cylinder is cut away through its entire length through about one-third of its circumference. On one edge of the portion of the cylinder from which a part is cut away, and that the lower edge as it is placed in the rake, are arranged the projections 13, which are bent down so that they lie between the teeth 14 and close to the ground as the rake is in operation. These projections 13 are provided on their under side with shoes to rest on the ground.

The cylinder may be made a true cylinder, and set at right angles to the axial line of the teeth of the rake, or it may be made slightly conical, or set so that the end nearer the side frame, 11, may be slightly farther back than the other end.

The interior surface of the cylinder has on it springs 15, attached thereto by one end, which springs project spirally about the cylinder and toward the center thereof, being so arranged that they may be pressed back against the surface of the cylinder.

In the side frame, 10, of the rake-frame, at or near the center of the cylinder, is journaled a short shaft, which bears at one end on the bridge 16, attached to the outside of the side frame, 10, of the rake-frame. In the cylinder within the rake-frame, and on this short shaft, rigidly attached to it, is the cone-twister 17. (Shown in Fig. 4.) This cone-twister 17 is provided on its surface with a spiral step, 18, extending about it from its base to its apex, and longitudinal grooves or notches 19, as more clearly seen in Fig. 4. The cone is at each step decreased in diameter the height of the step, and gradually decreases between the different steps from the base toward the apex.

The shape of the longitudinal groove 19 is such that one side has a gradual, and the other side a very rapid, descent, making an abrupt edge on one side of each "land" lying between the grooves.

On that portion of the shaft to which the cone-twister is fastened, which is between the side frame, 10, and the bridge 16, is the gear 20, which receives motion from the main gear 21 on the axle 4 through the idler 22, the idler being held in position by the double links 23 and 24.

The double link 23 (one link on either side of the wheels) connects the axle 4 with the axle of the idler 22, and the double link 24 (one link on either side of the wheels) connects the shaft of the cone-twister with the axle of the idler 22, also leaving the idler free to move around both the wheels 20 and 21 and to revolve, but keeping it in contact with both the gear-wheels 20 and 21.

The teeth 14 14 are made with a slot, 25, parallel with or through the axial line of the tooth, and have an extension in the rear of this slot, in which rear extension is made the slot 26 at an angle of about forty-five degrees with the axial line of the tooth, measuring on the upper side from the forward end.

The teeth 14, made as above described, are fastened to the rake-frame by a bolt or rod, 27, passing through the slots 25 25 and the side frames, 10 and 11, and by the bolt 28, passing through the slots 26 26 and side frames, 10 and 11. The teeth each pass through a cut made in the cylinder between each projection 13 and the projection next it, made for that purpose, and act as guides. The teeth are held in proper place on the bolt 28 by sleeves introduced on the bolt between each tooth for that purpose. Each tooth is pressed forward by a spring, 29 29, rigidly attached to a cross-bar of the rake-frame, and by the slots 26 26 operating on the bolt 28 the rear extension of each tooth is raised and the forward end lowered. Each tooth may be moved backward and forward, and as it is so moved will be given a slight turning motion about the bolt 27 by the action of the angular slot 26 on the bolt 28.

On each tooth, just forward of the lower edge of the cylinder, is fastened a strip or spring, 30, which extends up into the cylinder and presses on its interior surface. This presses the tooth to which it is attached forward and bridges over the crevice between the top of the tooth and the cylinder, (necessarily left that the tooth may oscillate about the bolt 27,) and raises the hay over it. This spring may be made of such form and stiffness as to do away with the necessity of the spring 29.

On the main frame 1 is pivoted the lever 31, on which is arranged the bolt 32, to work in notches 33 in the quadrant 34, attached to the main frame. The lower end of this lever extends past the rake-frame and presses against a pin therein when the lever and rake-frame are in certain positions. By an adjustment of the lever the rake-frame and all the parts thereto attached may be pushed back, swinging on the links 6, 7, 8, and 9. It is made to approach the main frame 1, rising from the ground without tipping. The rake-frame is always free to be pushed back by an obstruction, and being pushed back rises over it, the pin in the rake-frame leaving the lever at that time.

The operation of the rake is as follows: The rake is drawn across a field on which is cut grass or hay. The motion of the main wheels through the gearing turns the cone-twister in the direction indicated by the arrow in Fig. 2. The height of the rake frame and teeth is adjusted by the lever, the gearing adapting itself, by means of the idler and links, to any position. The teeth of the rake pass under the hay and raise it slightly from the ground. The projections on the lower edge of the cylinder run under the hay, and it is carried into the cylinder, being drawn by the revolutions of the conical twister, the abrupt or sharp edges of the longitudinal grooves coming in contact with the hay to give a better "bite" to the cone-twister, and as the hay accumulates on the cone-twister it is pressed against the spirally-arranged springs 15 on the interior of the cylinder, and the cone-twister, revolving within the surrounding hay, pushes, by the spiral step thereon, a portion of the twisted hay out the open end of the cylinder in the form of rope, which is deposited on the ground between the end of the cylinder and the adjacent wheel, sufficient space being left between them for this purpose. Each tooth, if run against an obstruction, will independently press back, and the front end will rise to a certain extent without materially altering the position of the rest of the rake. When a greater obstruction is met, or an obstruction comes in contact with the cylinder or its projections, the rake-frame and all parts attached are swung back and up and pass over the obstruction.

The modification shown in Fig. 5 consists of the internal rack-bar, 37, attached to the inner side of the wheel 2, gearing with the wheel 20 on the shaft of the cone-twister instead of the gearing shown in Fig. 1. The links 6, 7, 8, and 9 are of such a length as to keep the wheel 20 on the rack 37 in all the changing positions of the rake-frame, owing to its swinging back by the adjustment of the lever 31 or from the pressure of an obstruction.

The teeth 14 14 may in either form of rake be rigidly attached to the rake-frame and cylinder, or so attached that each may have independent movement, as above set forth.

The rake-frame may be so fastened to the main frame that the shaft of the cone-twister will be kept in the same relative position to the shaft or axle 4, but so arranged that it (the rake-frame) may be tipped up and down to raise and lower the front ends of the teeth.

What I claim as new, and desire to secure by Letters Patent, is—

1. The combination, in a rake, of teeth and a cylinder having a projection on the edge thereof, between each two teeth, substantially as specified and set forth.

2. The combination, in a rake, of teeth and a cylinder having within it a cone-twister and operating mechanism, as specified.

3. The main frame, axle, and wheels, combined with a rake-frame, rake-teeth, cylinder, and revolving cone-twister and operating mechanism, substantially as specified.

4. As an article of manufacture, a rake-tooth having a rear extension and having two slots cut therein at an angle to one another, as specified.

5. The rake-tooth fastened to the rake-frame by pins passing through slots therein cut in the tooth at an angle with one another, substantially as specified.

6. The rake-tooth attached to the rake-frame by two bolts passing through two slots in the tooth at an angle to one another, each bolt passing through one slot in the tooth, combined with a spring on the rake-frame pressing forward against the rear end of the tooth, substantially as specified.

7. The cylinder having a portion of its circumference cut away through its entire length, having on the edge thereof projections between which the teeth are guided, in combination with a cone-twister and operating mechanism, as specified and set forth.

8. The combination, in a rake, of a supporting main frame and a rake-frame thereto attached by pendent links at two or more points in the length of the rake-frame, and adjustable mechanism by which the swinging motion of the rake-frame may be stopped in one direction and left free in the reverse direction, substantially as specified.

G. G. FRELINGHUYSEN.

Witnesses:
PERRY BELMONT,
ARTHUR DUDLEY VINTON.